United States Patent [19]

Tetzlaff

[11] 4,283,178
[45] Aug. 11, 1981

[54] ELECTROMECHANICAL BRAILLE CELL

[75] Inventor: James F. Tetzlaff, Woodside, Calif.

[73] Assignee: Telesensory Systems, Inc., Palo Alto, Calif.

[21] Appl. No.: 53,991

[22] Filed: Jul. 2, 1979

[51] Int. Cl.³ .............................................. G09B 21/00
[52] U.S. Cl. .................................................... 434/114
[58] Field of Search .................. 35/35 A, 38; 340/407

[56] References Cited

U.S. PATENT DOCUMENTS

| 1,487,115 | 3/1924 | Quarrie | 35/35 A X |
| 3,229,387 | 1/1966 | Linvill | 35/35 A |
| 4,044,350 | 8/1977 | Tretiakoff et al. | 340/407 |

FOREIGN PATENT DOCUMENTS 608509  1/1935  Fed. Rep. of Germany .......... 35/35 A

OTHER PUBLICATIONS

Final Report, Project No. 142112, Grant No. DEG-0-8-071112-2995, *Research and Development of Tactile* FAcsimile *Reading Aid for the Blind*, Linvill, Mar. 1973, pp. iii and 27.

Primary Examiner—William H. Grieb
Attorney, Agent, or Firm—Harry E. Aine; Harvey G. Lowhurst

[57] ABSTRACT

An electromechanical braille cell is disclosed wherein each cell includes six braille indicia formed by the free ends of a vertical stack of cantilever supported piezoelectric reeds. Applying an operating potential to a respective reed causes the reed to bend about a fulcrum at the supported root end of the reed causing the free end to deflect in such a manner as to cause the indicia rod to protrude through an opening in the reading surface of the braille cell. Simultaneous energization of one or more of the reeds in the respective stack defines a given braille character sensed by the operator. The free ends of the reeds are tiered in pairs in a stair step configuration so that the sensing rods from a lower pair of reeds pass by the free end portions of the reeds of a higher step. The upper reed of each pair of reeds is notched to allow passage of the sensing rod associated with the lower reed of that pair of reeds.

6 Claims, 6 Drawing Figures

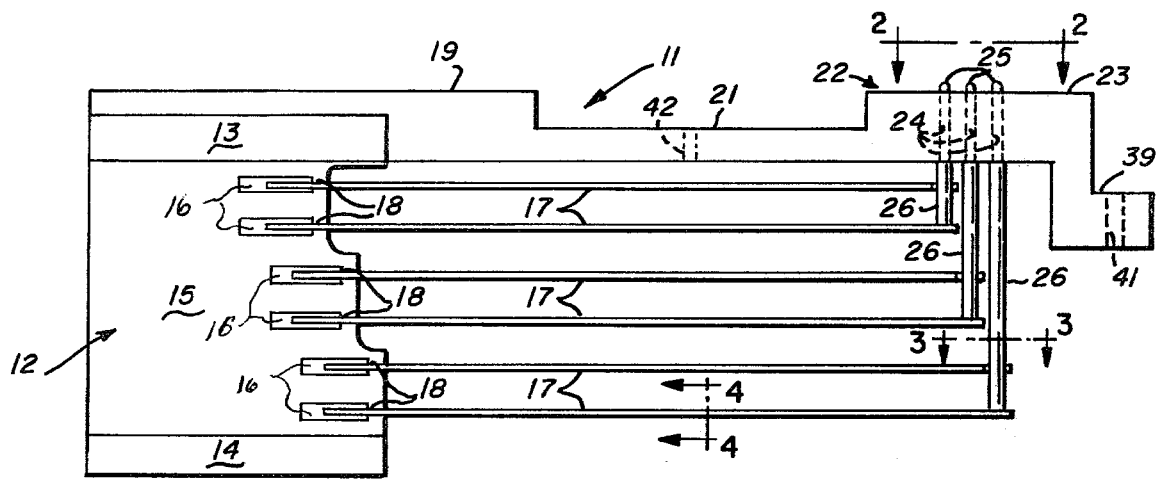
Fig_1
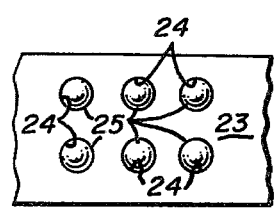
Fig_2
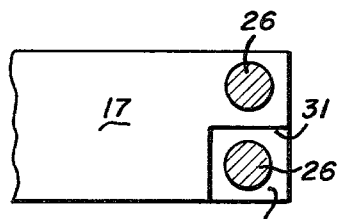
Fig_3
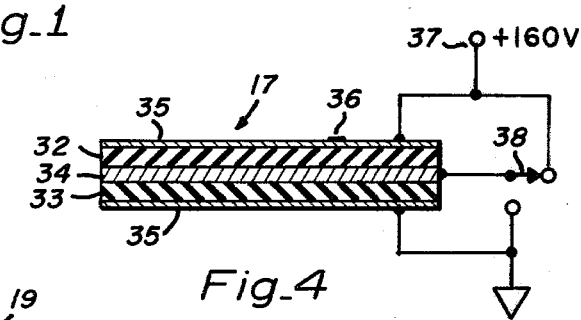
Fig_4
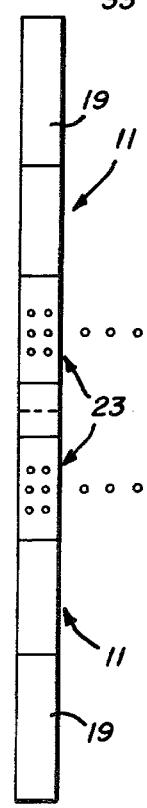
Fig_6
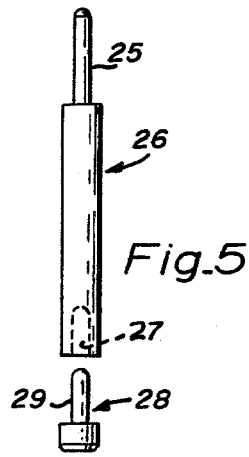
Fig_5

ELECTROMECHANICAL BRAILLE CELL

BACKGROUND OF THE INVENTION

The present invention relates in general to electromechanical braille cells and, more particularly, to an improved piezoelectric mechanical braille cell.

DESCRIPTION OF THE PRIOR ART

Heretofore, electromechanical braille cells have utilized six piezoelectric reeds which bend in response to the application of an electric voltage thereacross for urging the tip of sensing rods through an array of six openings in a braille cell reading surface. The protruding tips of the sensing rods are sensed by the finger of the operator to define a braille character. One such prior art arrangement is disclosed in U.S. Pat. No. 4,044,350 issued Aug. 23, 1977. In this arrangement, the piezoelectric reeds are supported at both ends and the center portions deflect in response to the applied voltage for actuating the sensing rods. One of the problems with this arrangement is that the reeds are relatively long and since the reeds project laterally away from the braille cell on both sides, the spacing between adjacent lines of braille cells must be relatively large, i.e. on the order of the length of the individual reeds.

Another problem with this prior art arrangement is that two side-by-side vertical stacks of three reeds are used and relatively complicated coupling means are provided for coupling the individual sensing rods to the respective reed while also allowing passage of the other two sensing rods therethrough.

It is also known from the prior art to provide an array of cantilevered piezoelectric reeds inclined at a substantial angle to a base support. This arrangement provides horizontal separation between the respective free ends of the reeds and thus of the respective sensing rods. However, mounting the piezoelectric reeds in such a manner that the braille sensing rod does not extend at right angles from the reed reduces the amount of travel that a given rod may achieve for a given reed length. This latter arrangement is disclosed in U.S. Pat. No. 3,229,387 issued Jan. 18, 1966.

Other prior art references arrange the stack of piezoelectric reeds in a stair step configuration such that the sensing rod associated with each successively lower reed in the stack passes by the free ends of all of the other reeds positioned above it in the stack. Such an arrangement is disclosed in the final report for the U.S. Department of Health, Education and Welfare Grant No. OEG-08-071112-2995 dated March 1973 (See FIG. 12 page 27).

SUMMARY OF THE PRESENT INVENTION

The principal object of the present invention is the provision of an improved electromechanical braille cell and, more particularly, to such a cell employing a vertical stack of cantilevered piezoelectric reed elements.

In one feature of the present invention, the free ends of a stack of cantilevered piezoelectric reeds are arranged in a stair step fashion with each step of the stair step comprising a pair of reeds with the upper reed of each pair being apertured for passage of the sensing rod therethrough from the lower reed, whereby fabrication of the braille cell is simplified and facilitated.

In another feature of the present invention, the aperture in the upper one of each pair of stair stepped reeds is formed by notching out a corner of the tip of the upper reed in each pair.

In another feature of the present invention, the sensing rods which are driven from the respective piezoelectric reeds are adjustable in length by means of an adjusting member which telescopes in tight frictional engagement within the hollow interior of the main rod portion, such that the telescoping member is retained in position by means of the interference fit between the adjusting member and the main body portion.

Other features and advantages of the present invention will become apparent upon a perusal of the following specification taken in connection with the accompanying drawings wherein:

BRIEF DESCRIPTION OF THE DRAWINGS

FIG. 1 is a side elevational view of an electromechanical braille cell incorporating features of the present invention, FIG. 2 is an enlarged plan view of a portion of the structure of FIG. 1 taken along line 2—2 in the direction of the arrows, FIG. 3 is an enlarged sectional view of a portion of the structure of FIG. 1 taken along line 3—3 in the direction of the arrows, FIG. 4 is an enlarged cross sectional view of one of the piezoelectric reeds of FIG. 1 taken along line 4—4 in the direction of the arrows, and schematically depicting the electrical circuitry for applying the operating potential to the respective reed, FIG. 5 is an enlarged exploded view of one of the sensing rods of FIG. 1, and FIG. 6 is a plan view of a plurality of the braille cells of FIG. 1 arranged for display of two lines of braille text.

DESCRIPTION OF THE PREFERRED EMBODIMENTS

Referring now to FIGS. 1 and 2 there is shown an electromechanical braille cell 11 incorporating features of the present invention. The braille cell 11 includes a vertical base plate 12 as of ABS plastic material formed by injection molding and having upper and lower horizontal flange portions 13 and 14 with a recessed central web portion 15 extending vertically therebetween. The web portion 15 is notched from the inside edge to provide six generally rectangular openings 16 to receive the root portions of six piezoelectric reeds 17. The piezoelectric reeds are captured in an interference fit at a restricted neck portion 18 at the entrance to each of the rectangular openings 16. The neck portions 18 define fulcrum points about which the piezoelectric reeds 17 bend in response to an applied operating voltage. A top plate 19 is secured to the base plate 12 via the intermediary of screws, not shown. The top plate 19 is recessed at 21 and 39 to receive stringers, not shown, for mounting the individual braille cells 11 transversely of the stringers.

A sensing plate portion 22 of the top plate 19 includes an upper sensing surface 23 which is apertured by means of six vertically directed bores 24 which slideably receive therewithin a narrow neck portion 25 of a sensing rod 26. The upper end of the sensing rod 26 is rounded. That portion of the rod which protrudes above the surface 23 is sensed by the finger of the operator to determine the pattern being displayed on the individual braille cell 11.

The lower extremity of the sensing rod 26 (see FIG. 5) is counterbored at 27 to slideably receive therewithin in a telescoping manner a rod extender insert 28. The insert 28 includes a dowel portion 29 which slides within the counterbore 27 in the main body of the rod 26. The dowel portion makes a tight interference fit with the internal walls of the bore 27 so that by adjusting the degree of penetration of the dowel 29 the axial length of the composite rod structure 26 is determined.

The sensing rods 26 rest at their lower extremity upon the free end portions of the respective piezoelectric reeds 17. The reeds 17 are cantilevered about the fulcrum support 18 with the free end portions thereof supporting their respective sensing rods 26. The reeds are arranged in a stair step fashion in pairs. The upper most reed of each pair is apertured to allow passage therethrough of the sensing rod resting upon the lower most reed of each pair. The aperture is conveniently formed by a notch which notches out one of the corners of the respective reed. Such a notched corner is shown at 31 in FIG. 3. The sensing rod 26 associated with the upper most reed of each stair step pair rests upon the corner of the reed at the free end of the reed 17. The sensing rods 26 associated with the successively lower pairs or steps of the stack of reeds 17 pass by the ends of the reeds above that pair in the stack of reeds 17.

Referring now to FIG. 4, the piezoelectric reeds 17 each comprise a sandwich structure of piezoelectric material in which two layers of electrically polarized piezoelectric material 32 and 33 sandwich therebetween a leaf of conductive material 34, as of brass. The outer surfaces of the piezoelectric layer 32 and 33 are covered with a thin layer of electrically conductive material 35 as of gold or nickel. In a typical example, the reeds are approximately a ¼ inch wide, 2 inches in length and the brass leaf 34 has a thickness as of 0.001 to 0.002 inch and piezoelectric layers 32 and 33 have thicknesses as of 0.007 to 0.008 inch. The conductive layer 35 has a thickness, as of 50 micro inches. Such reeds are commercially available from NGK of Nagoya, Japan as model MT-114H bimorphous elements.

The reeds utilized herein are electrically polarized for parallel operation at the factory by the application of a high voltage across conductive layer 35. A polarization mark 36 indicates the positive terminal during the polarizing process.

The operating potentials are applied to the respective reeds 17 by means of a circuit schematically indicated in FIG. 4. More particularly, a source of relatively high voltage, as of +160 volts is applied to terminal 37 which is connected to the upper layer 35 of the bimorphous piezoelectric reed 17. The central leaf 34 is connected to one terminal of a double pole-double throw switch 38 which is preferably a transistor switch. The lower face electrode 35 of the reed 17 is connected to ground. The switch 38 selectively couples the central leaf 34 either to the high positive potential or to ground potential which either places the full 160 volts across the lower piezoelectric layer 33, or across the upper piezoelectric layer 32 as determined by the position of switch 38.

When positive potential is applied across the upper piezoelectric layer 32, it deflects the reed upwardly about the fulcrum 18 and conversely when the positive potential is applied across the lower piezoelectric layer 33 it deflects the reed 17 downwardly about the fulcrum 18. The bending moment selectively applied to the reed causes the sensing rod 26 associated with that reed to be either fully elevated as determined by the shoulder of the rod being stopped by the marginal edge of the respective bore 24 in the sensing plate 19 or conversely when the bending moment is downward, the reed deflects downward and gravity operating on the respective sensing rod 26 causes the rod to be fully retracted so that the degree to which the sensing rod protrudes if any from the sensing surface 23 is greatly reduced relative to the amount of protrusion when the rod is fully elevated. The operator senses the pattern of protruding rods 26 to define a given braille character.

Electrical connection is made to the root ends of the respective reeds by means of a printed circuit board, mating with the recessed web 15 not shown, and leads which connect the circuit on the printed circuit board to the respective terminals of each of the respective reeds 17 in a manner as indicated in FIG. 4.

In a typical example, the sensing rod 26 is made of ABS plastic, has a diameter of 0.082 inch and a length for the neck portion 25 of 0.328 inch. The rods are conveniently made by injection molding and their length from the shoulder to the base varies from 0.095 inch to 0.845 inch.

An advantage to the manner in which the electrical potentials are applied to the reeds 17 as shown in FIG. 4 is that the piezoelectric layers 32 and 33 are permanently electrically polarized in the same sense as that of the applied operating electric field. More particularly, the electric vector of layer 32 is perpendicular to and directed toward the plane of the central leaf 34, whereas the permanent electric polarization vector of the lower piezoelectric layer 33 is normal to the leaf 34 and directed away from the leaf. The applied voltage for actuation of the reed 17 is thus always applied in the direction of the electric field polarization of the layers 32 and 33. In this manner, depolarization of the reeds with useage does not occur.

The inner ends of the respective top plates 19 are recessed at 39 for mounting to a stringer, not shown, extending laterally of the individual electromechanical braille cells 11. The recessed portion 39 includes a vertical bore 41 to receive a screw passing into a tapped bore in the stringer. Similarly, a tapped bore 42 is provided in the centrally recessed portion 21 of the top plate to receive a screw passing through the central stringer and threadably mating with the threads of the bore 42.

The advantages of the braille cell of the present invention include its simplified construction utilizing reeds 17 all of the same dimension with certain of the reeds being notched at 31. By cantilevering the reeds 17, the braille cells 11 may be arranged in a pair of rows, as shown in FIG. 6, thereby providing two relatively closely spaced lines of braille text.

What is claimed is:

1. In an electromechanical braille cell having a plurality of braille indicia:
   reed means comprising a stack of piezoelectric reeds cantilevered from a support structure for bending movement about a fulcrum at the support structure in response to the application of an operating voltage to respective ones of said piezoelectric reeds;
   sensing rod means for mechanical operative association with respective ones of said reed means for selective movement of respective ones of said rod means along the direction of elongation of said rod means in response to bending movement of respective ones of said reed means;

reading means having a plurality of openings therethrough intersecting with a braille reading surface to be scanned by the fingers of the braille reader to define a braille character, respective ones of said rod means being operative within respective ones of said openings in said reading means and for being elevated in one operative position above the surface of said reading surface to be sensed by the fingers of the reader and for retraction relative to said elevated position in another operative position; and each of said reed means being relatively broad having a pair of opposed broad faces and a pair of narrow side faces and being stacked with their respective broad faces in mutually opposed relation and with a plurality of said reed means having their free end portions extending beyond the terminus of a plurality of said other ones of said reed means, and at least one of said reed means having an opening extending therethrough from one broad face to the other to accommodate passage therethrough of one of said rod means.

2. The apparatus of claim 1 wherein said opening in one of said reed means comprises a notch extending into said reed means from an edge thereof.

3. The apparatus of claim 1 wherein the free ends of said reed means are tiered in pairs in a stair step configuration with the top reed of each stepped pair notched to provide said opening to accommodate passage therethrough of one of said rod means operatively associated with the lower reed in said stepped pair of reeds.

4. The apparatus of claim 3 wherein said reed means are of essentially the same length, and wherein said fulcrum points of support for said reed are tiered in pairs in a stair step configuration.

5. The apparatus of claim 1 wherein said rod means each include a shoulder portion for engagement with the marginal edge of the opening in said reading means through which said rod means passes for limiting the axial extent of travel of the respective rod means within said opening in said reading means and thus for determining the maximum projection of the respective rod means above the braille reading surface.

6. The apparatus of claim 1 including means slideably inserted within each of said sensing rod means for adjusting the length of said composite sensing rod means.

* * * * *